US012492001B2

(12) United States Patent
Lopez et al.

(10) Patent No.: US 12,492,001 B2
(45) Date of Patent: Dec. 9, 2025

(54) ITEM OF FURNITURE PROVIDED WITH A DEVICE FOR ROTATABLY DEPLOYING A MOVABLE ELEMENT

(71) Applicant: Safran Seats, Plaisir (FR)

(72) Inventors: Bruno Lopez, Moissy-Cramayel (FR); Pierre Leroy, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 19/108,700

(22) PCT Filed: Jul. 25, 2023

(86) PCT No.: PCT/EP2023/070621
§ 371 (c)(1),
(2) Date: Mar. 4, 2025

(87) PCT Pub. No.: WO2024/056258
PCT Pub. Date: Mar. 21, 2024

(65) Prior Publication Data
US 2025/0256848 A1    Aug. 14, 2025

(30) Foreign Application Priority Data
Sep. 14, 2022 (FR) ..................... 2209220

(51) Int. Cl.
*B64D 11/06* (2006.01)
(52) U.S. Cl.
CPC ............... *B64D 11/0638* (2014.12)
(58) Field of Classification Search
CPC ..... B64D 11/0638; A47C 7/622; A47C 7/624; A47C 7/626; A47C 7/68
(Continued)

(56) References Cited

U.S. PATENT DOCUMENTS 6,247,733 B1    6/2001 Weiland
8,109,566 B2 *  2/2012 Koh ................. A47B 83/02
                                    297/145
(Continued)

FOREIGN PATENT DOCUMENTS

JP    2015131531 A    7/2015

OTHER PUBLICATIONS

International Application No. PCT/EP2023/070621, International Preliminary Report on Patentability mailed on Mar. 27, 2025, 15 pages (8 pages of Original Document and 7 pages of English Translation).

(Continued)

*Primary Examiner* — Jose V Chen
(74) *Attorney, Agent, or Firm* — Kilpatrick Townsend & Stockton LLP

(57) ABSTRACT

The invention relates to an item of furniture, in particular for an aircraft seat, comprising:
  a frame,
  a movable element,
  a pivot connection for rotating the movable element relative to the frame between a folded position and a deployed position,
  a locking finger,
  a cam provided with a locking recess and
  an elastic member for biasing, when it is under tension, the locking finger inside the locking recess when the movable element is in the folded position,
  such that pressure on the movable element causes the elastic member to rotate the movable element and release the locking finger from the locking recess to enable the movable element to rotate towards the deployed position in a second direction of rotation.

10 Claims, 7 Drawing Sheets

(58) Field of Classification Search
USPC ................ 297/144, 150, 154, 137, 173, 142
See application file for complete search history.

(56) References Cited

U.S. PATENT DOCUMENTS

| | | | | |
|---|---|---|---|---|
| 8,419,124 | B2* | 4/2013 | Kramer | A61G 5/128 |
| | | | | 297/173 |
| 8,668,257 | B2* | 3/2014 | Wu | A47C 7/70 |
| | | | | 248/446 |
| 9,114,879 | B2* | 8/2015 | Ligonniere | B64D 11/0638 |
| 10,464,460 | B2* | 11/2019 | Kondrad | B60N 2/90 |
| 10,836,493 | B2* | 11/2020 | Mehlos | B64D 11/0638 |
| 12,258,131 | B2* | 3/2025 | Satterfield | B64D 11/0605 |
| 2003/0062730 | A1 | 4/2003 | Shirase | |
| 2011/0163575 | A1* | 7/2011 | Kramer | A47C 7/62 |
| | | | | 297/411.3 |
| 2013/0093221 | A1* | 4/2013 | Ligonniere | B64D 11/06 |
| | | | | 297/173 |
| 2016/0090180 | A1* | 3/2016 | Thompson | F16C 19/50 |
| | | | | 384/590 |
| 2018/0251057 | A1 | 9/2018 | Bywaters et al. | |

OTHER PUBLICATIONS

International Appl. No. PCT/EP2023/070621, International Search Report, Translation of International Search Report, Written Opinion, and Translation of Written Opinion, dated Oct. 11, 2023, 11 pages.

Japan Patent Application No. 2025515346, Office Action, dated Aug. 12, 2025.

\* cited by examiner

[Fig. 3]
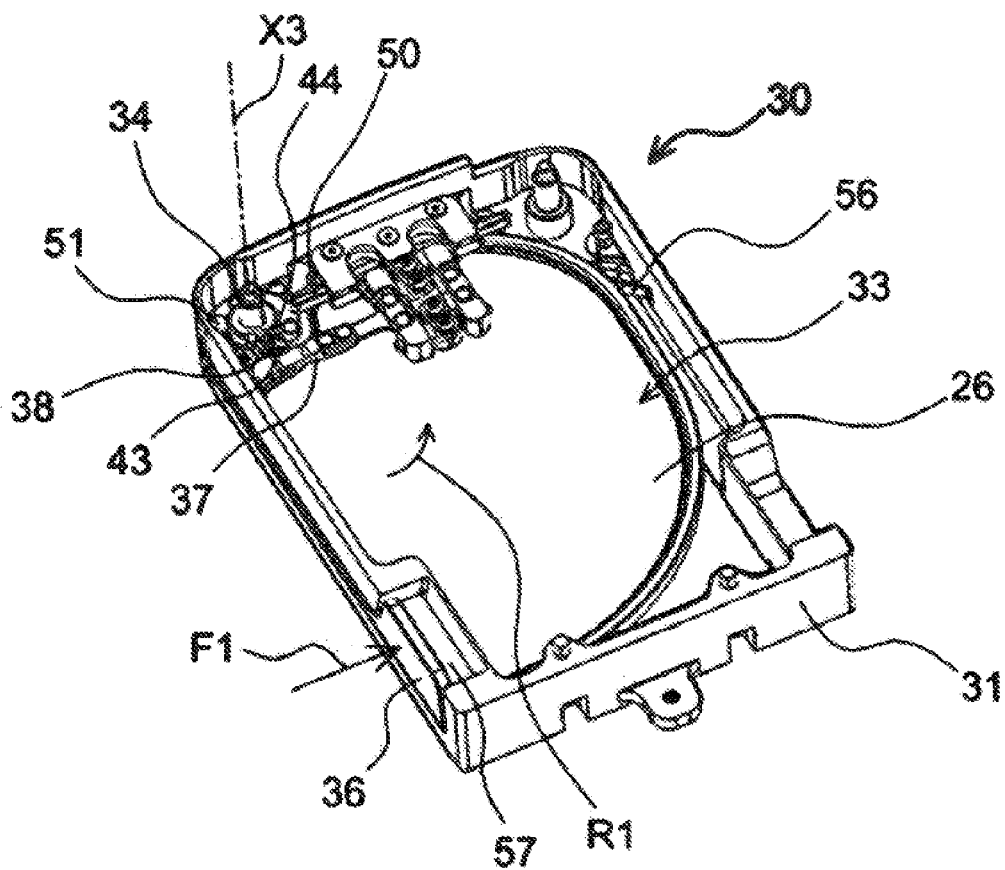
[Fig. 4]
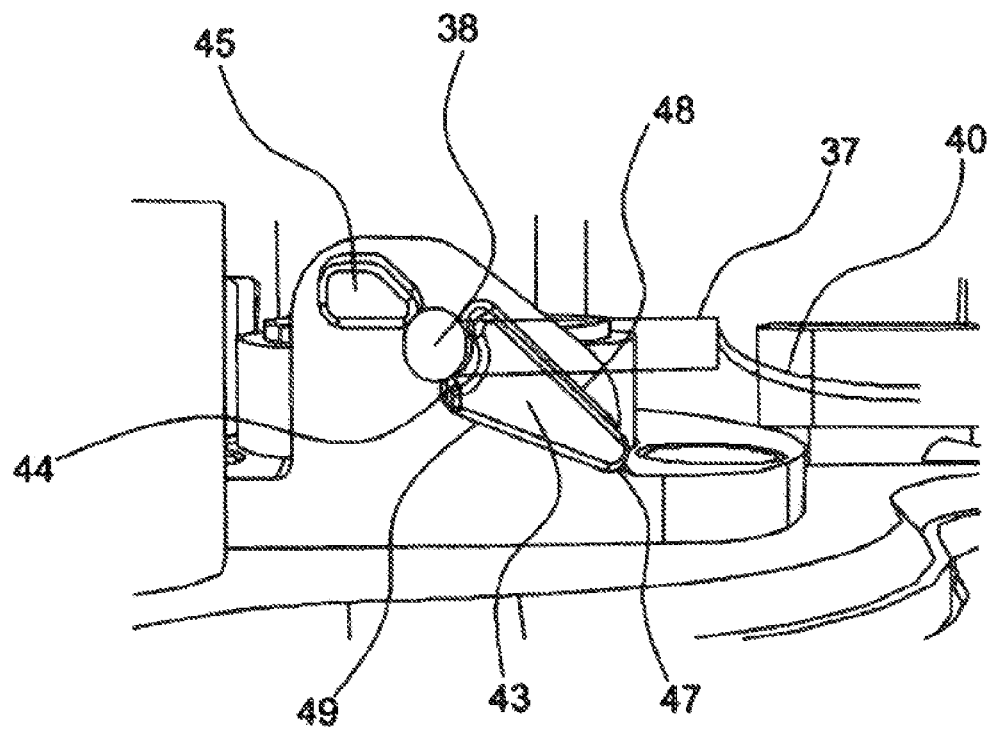

[Fig. 5]
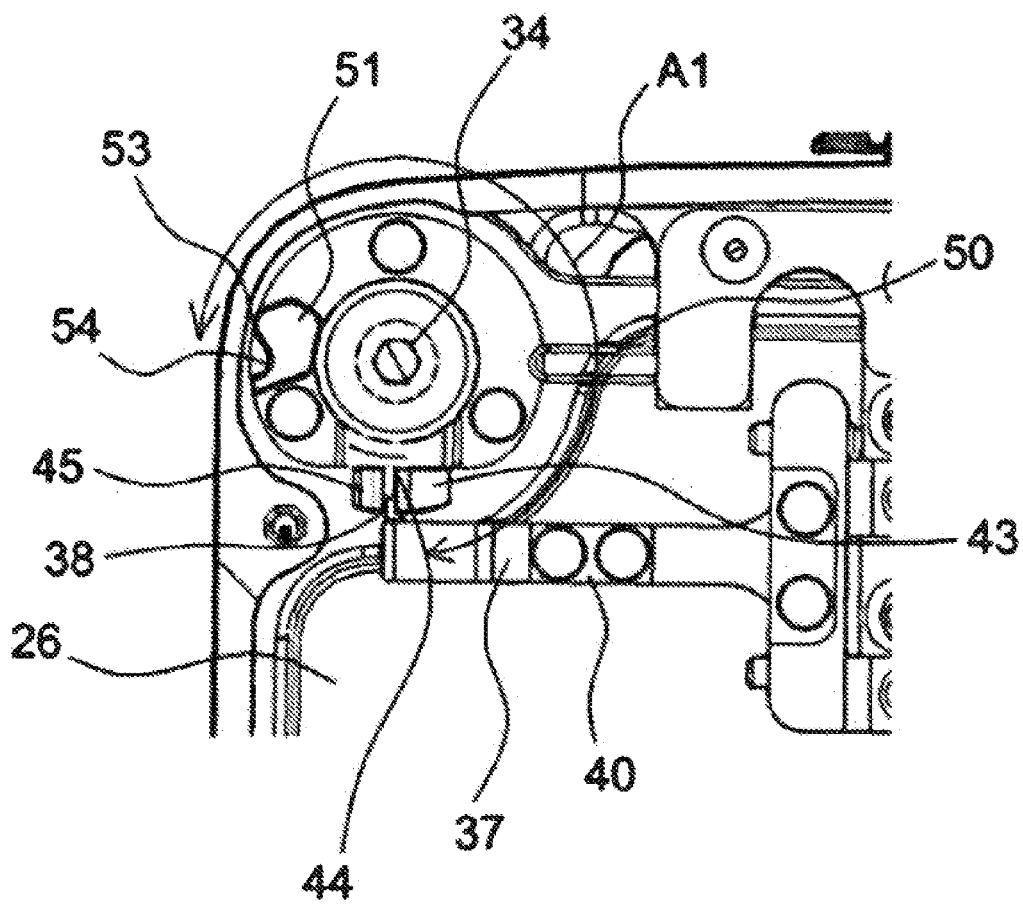
[Fig. 6]
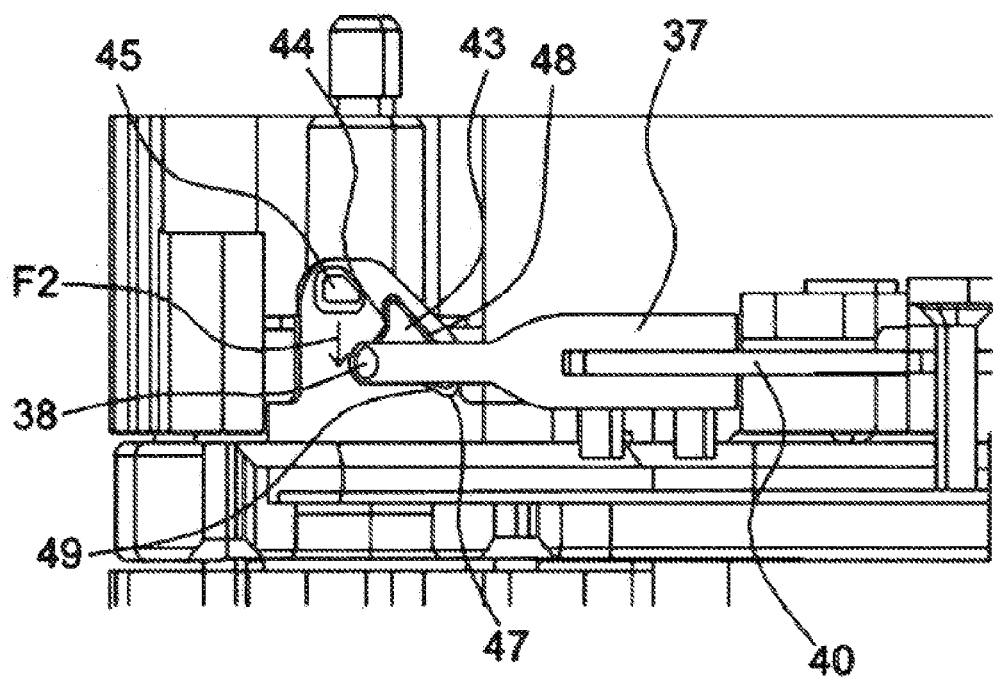

[Fig. 7]
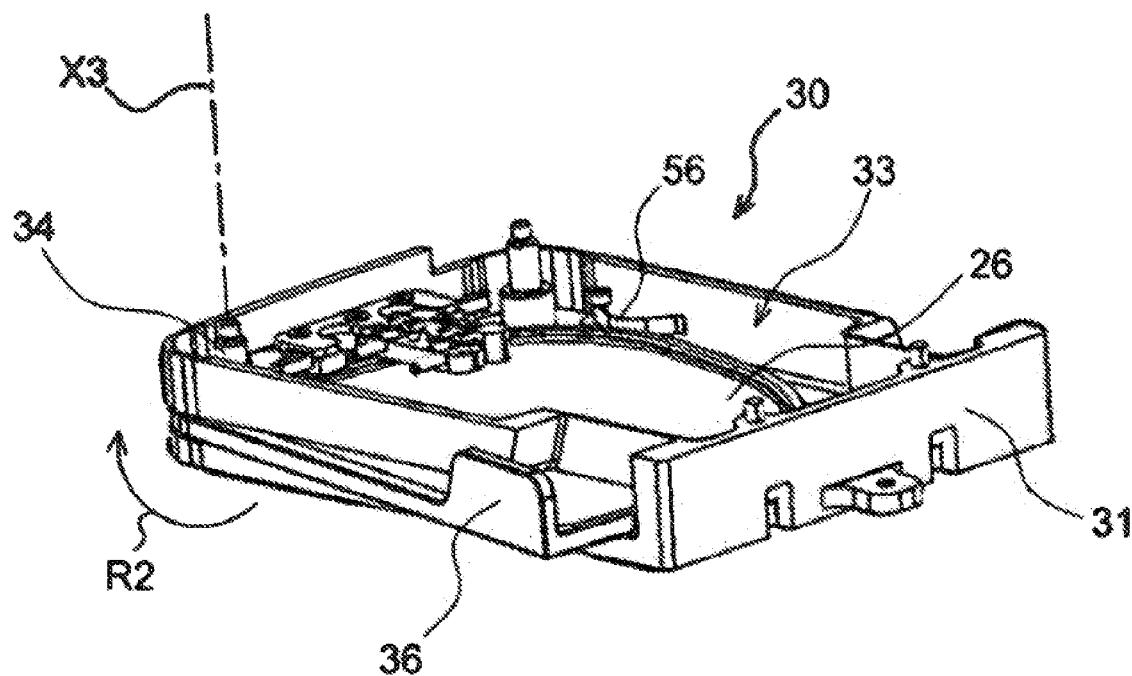
[Fig. 8]
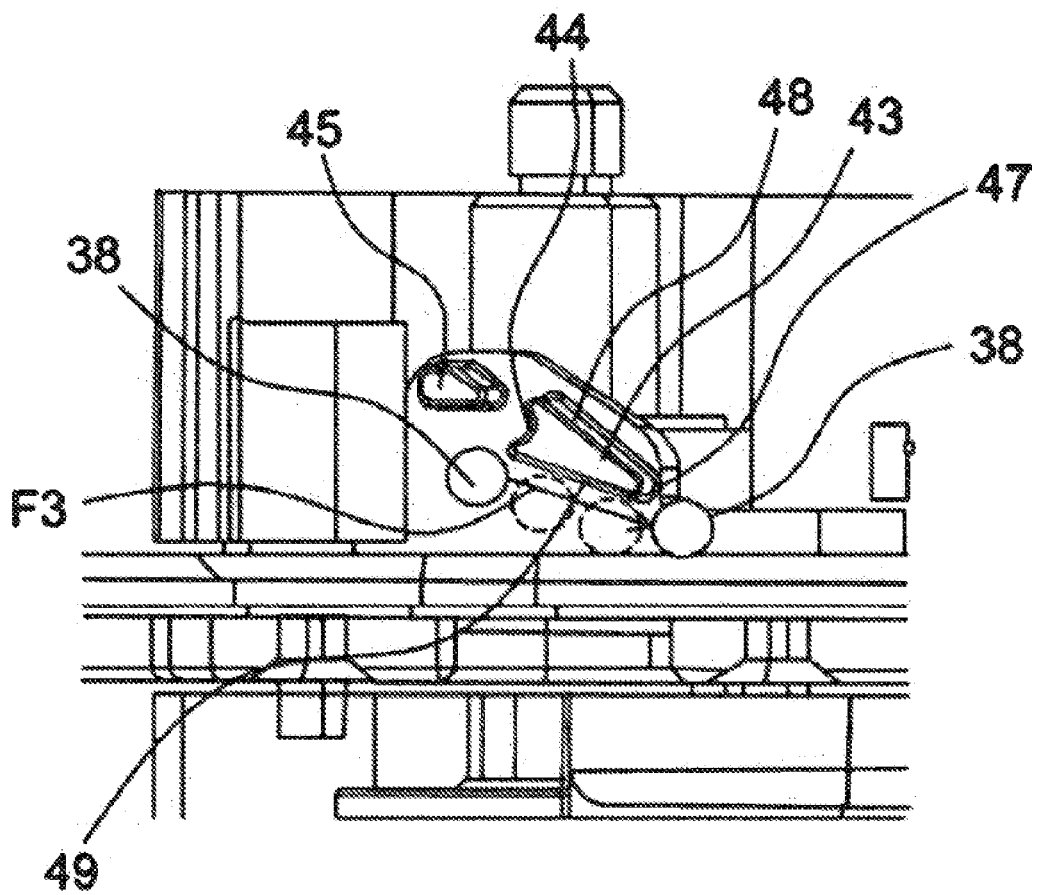

[Fig. 9]
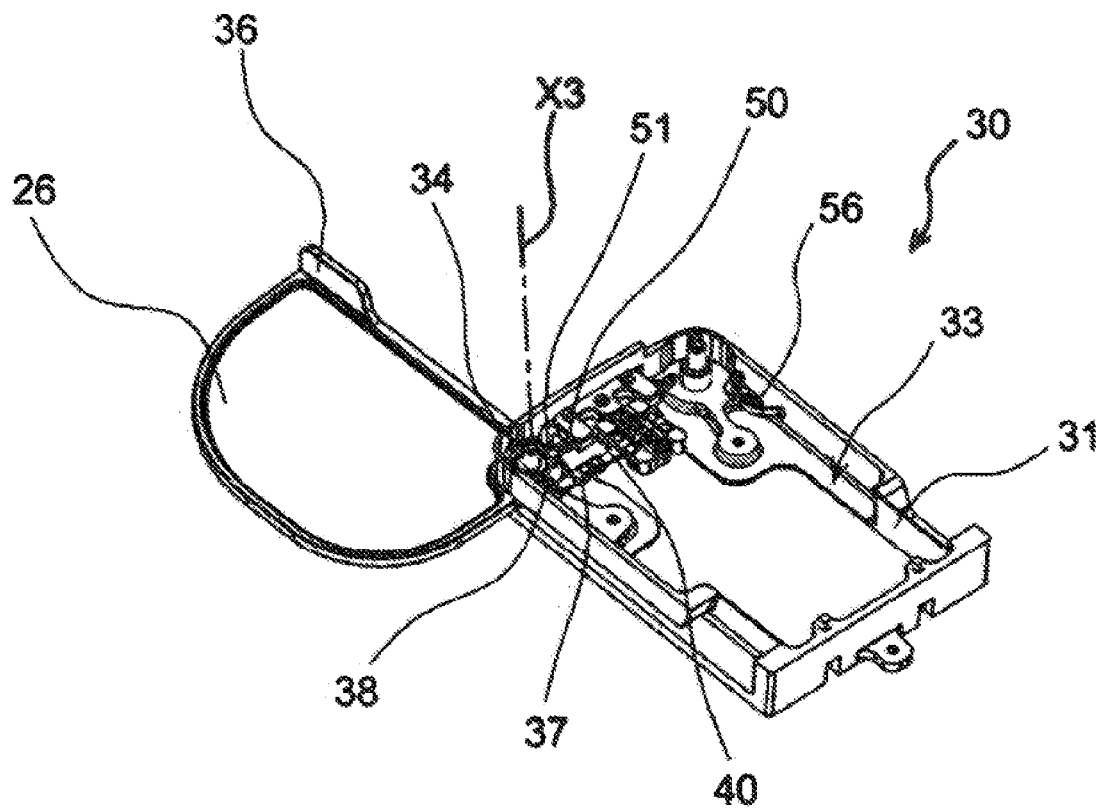
[Fig. 10a]
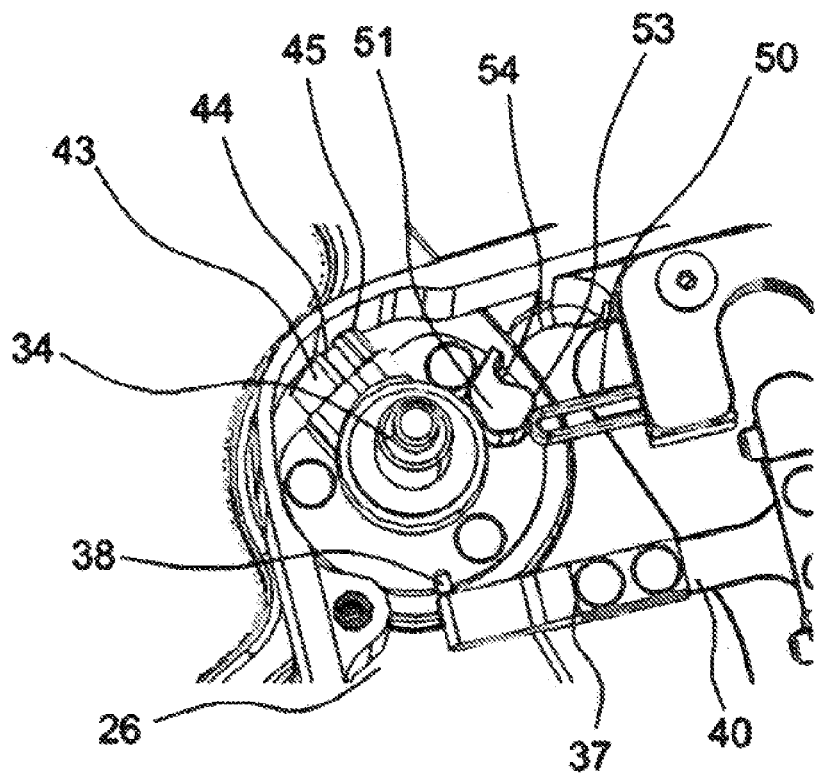

[Fig. 10b]
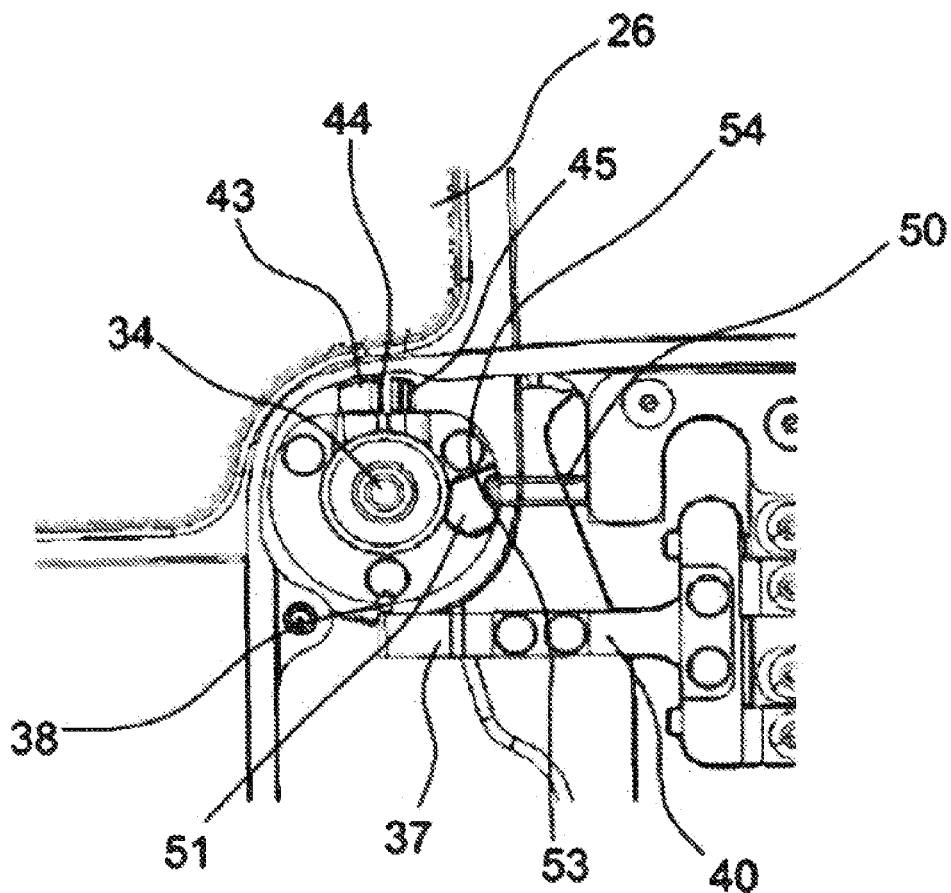
[Fig. 11]
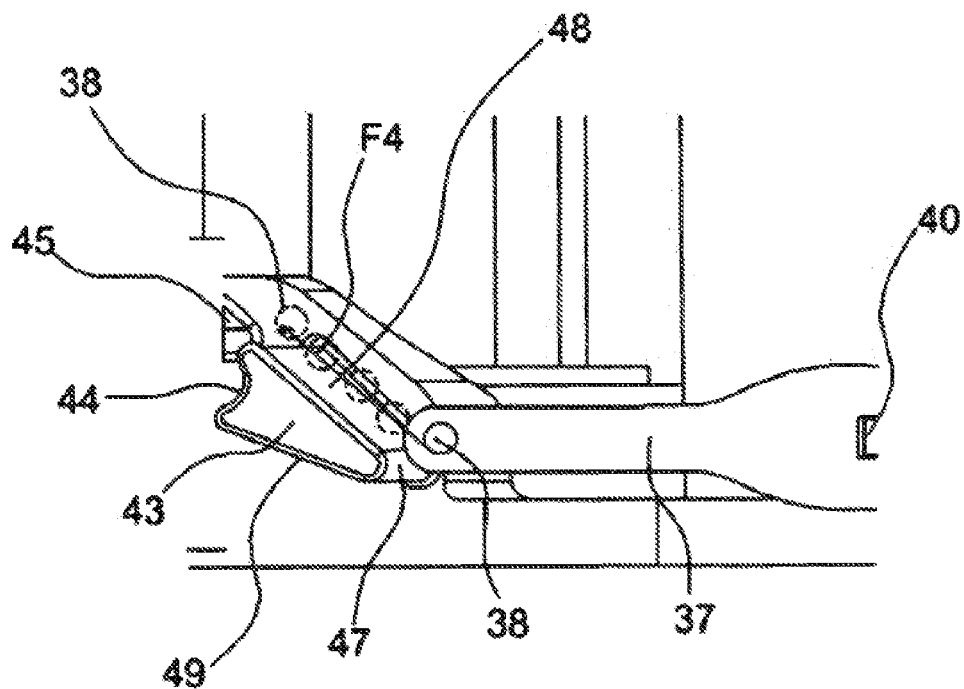

[Fig. 12]
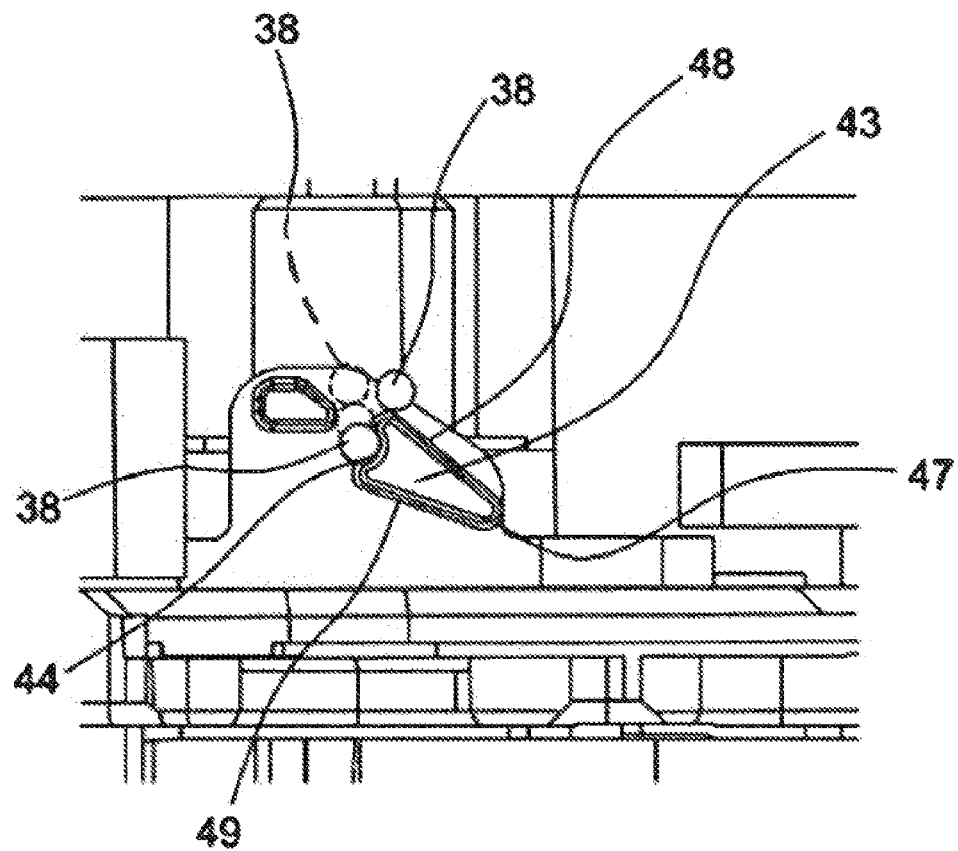

ITEM OF FURNITURE PROVIDED WITH A DEVICE FOR ROTATABLY DEPLOYING A MOVABLE ELEMENT

CROSS REFERENCE TO RELATED APPLICATIONS

This application is a U.S. national phase under 35 U.S.C. § 371 of International Patent Application No. PCT/EP2023/070621, filed on Jul. 25, 2023, which claims priority to France Patent Application No. 2209220, filed on Sep. 14, 2022, the entire contents of both of which are incorporated herein by reference in their entireties.

The present invention relates to an item of furniture provided with a device for rotationally deploying a movable element. The invention finds a particularly advantageous, but not exclusive, application with meal tray tables installed on aircraft seat units of the "business class" and "first class" type.

In a manner known per se, a deployment system of the "push-pull" type permits to facilitate the opening of a movable element of an item of furniture, such as for example a drawer, a furniture door, or a shelf. To this end, the user applies a pressure force to the movable element with the effect of activating an elastic member which moves the movable element away from its closed position. It is then possible for the user to pull the movable element towards its open position.

However, existing devices are bulky and generally operate according to translational kinematics. There is therefore a need for a deployment system of push-pull type for rotating movable elements.

The objective of the invention is to effectively meet this need by proposing an item of furniture, in particular for an airplane seat, comprising:
 a frame,
 a movable element,
 a pivot connection between the movable element and the frame for rotating the movable element relative to the frame between a stored position and a deployed position,
said item of furniture further comprising:
 a locking finger,
 a cam provided with a locking recess, and
 an elastic member for biasing, when it is under tension, the locking finger inside the locking recess when the movable element is in the stored position,
 such that pressing on the movable element causes the movable element to rotate in a first direction of rotation and release the locking finger from the locking recess by means of the elastic member so that the movable element rotates towards the deployed position in a second direction of rotation, the first direction of rotation and the second direction of rotation being opposite to each other.

The invention thus permits to integrate a system for deploying a movable element of the "push-pull" type about a pivot connection. The invention is also simple and robust in its implementation because the different functional shapes can be machined on the movable element. The invention also has an aesthetic character, insofar as the push-pull system is not visible to the user from outside the item of furniture.

According to one embodiment of the invention, said item of furniture comprises a return spring which can be compressed when pressing on the movable element and then decompressed so as to eject the movable element from the frame.

According to one embodiment of the invention, said item of furniture comprises a spring blade for cooperating with a limit stop when the movable element is in the deployed position.

According to one embodiment of the invention, the limit stop comprises a projecting portion constituting a hard point and a portion for receiving the spring blade.

According to one embodiment of the invention, the limit stop has an S shape.

According to one embodiment of the invention, the movable element integrates the cam and the limit stop, such that the movable element, the cam, and the limit stop form a single piece.

According to one embodiment of the invention, an angle between the limit stop and the locking recess of the cam is of the order of 270 degrees.

According to one embodiment of the invention, the cam comprises at least one lateral slope for guiding the locking finger towards the locking recess while compressing the elastic member when the movable element moves from the deployed position to the stored position.

According to one embodiment of the invention, the movable element is a tray table.

The invention also relates to an aircraft seat unit comprising an item of furniture as previously defined.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 3 is a perspective view of the internal structure of a frame containing a tray table according to the invention;

FIG. 4 is a side view illustrating the positioning of the locking finger inside the locking recess of the cam when the tray table is in a stored position;

FIG. 5 is a top view illustrating the relative positioning of the locking finger with respect to the limit stop of the tray table according to the invention;

FIG. 6 is a side view illustrating the release of the locking finger from the locking recess of the cam after applying a pushing force to the tray table according to the invention;

FIG. 7 is a perspective view showing a positioning of the tray table according to the invention after its ejection by the return spring;

FIG. 8 is a side view illustrating the trajectory of the locking finger when the tray table according to the invention is ejected by means of the return spring;

FIG. 9 is a perspective view of a tray table according to the invention in the deployed position;

FIGS. 10a and 10b are detailed perspective views illustrating the positioning of the stop blade respectively before and after the hard point of the limit stop;

FIG. 11 is a perspective view illustrating a trajectory of the locking finger along a slope of the locking cam as the tray table moves from the deployed position to the stored position so as to tension the elastic member;

FIG. 12 is a side view illustrating the guidance of the locking finger toward the locking recess of the cam as the tray table moves from the deployed position to the stored position.

It should be noted that the structural and/or functional elements common to the different embodiments have the same references. Thus, unless otherwise stated, such elements have identical structural, dimensional and material properties.

Furthermore, in the remainder of the description, the relative terms of the type "lower", "upper", "left", "right", "horizontal", "vertical" are understood by reference to the common meaning that a passenger in a seat with which an item of furniture according to the invention is associated would give them.

Figure 1:
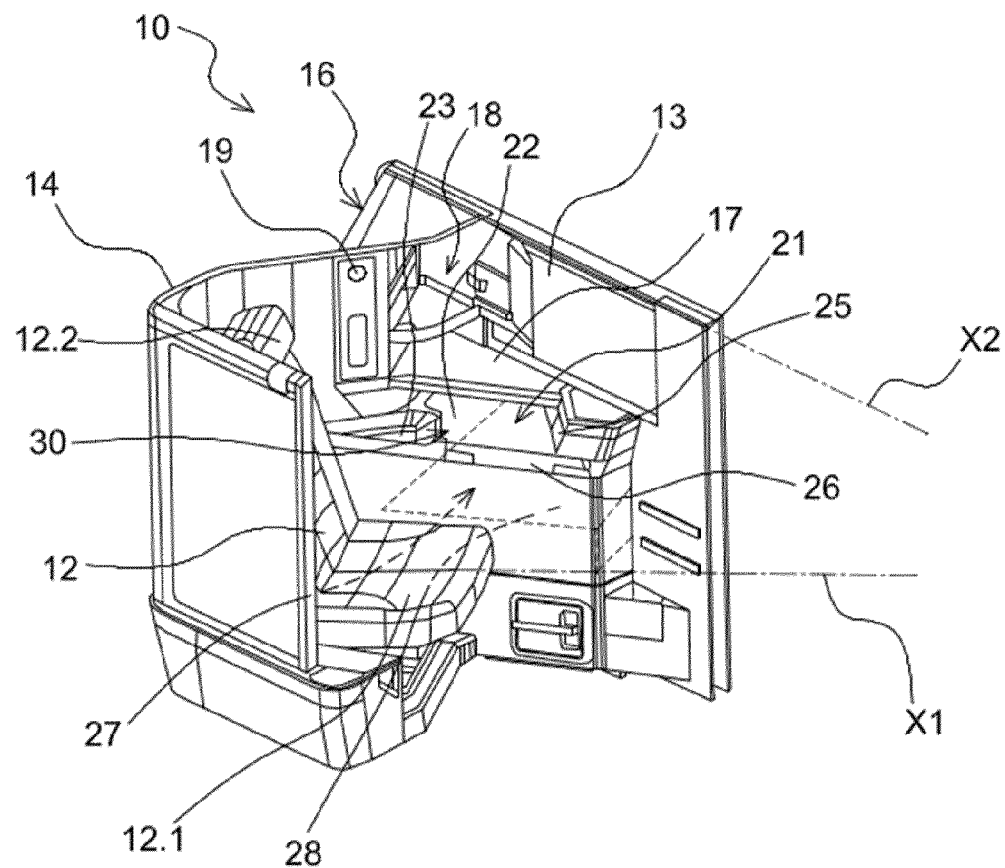
FIG. 1 is a perspective view of a seating unit having a tray table according to the present invention.

FIG. 1 shows a seat unit 10 comprising a seat 12 associated with a side console 13 extending along one side of the seat 12.

More specifically, the seat 12 comprises a seating pan 12.1 and a backrest 12.2. The seat 12 has an extension axis X1 defined by the intersection between a horizontal plane and a vertical median plane of the seat 12 corresponding to a plane of symmetry of the seat 12. The extension axis X1 of the seat 12 may form a non-zero angle with respect to a direction parallel to or coincident with a central axis of the aircraft X2. In this case, the seat 12 is turned in the direction of the axis X2. Alternatively, the seat 12 may be turned in a direction opposite to the axis X2 or extend parallel to the axis X2.

The seat 12 is advantageously provided with kinematics allowing it to be movable between a "seating" position, in which the seat 12 is configured to define a seating position of a passenger, and a "reclined" position, in which the seating pan 12.1 and the backrest 12.2 define a sleeping surface for the passenger, advantageously substantially horizontal. Intermediate comfort positions are also proposed, such as the "relax" position in which a backrest of the seat 12 is strongly inclined.

A privacy shell 14 extends at least partly around the seat 12 so as to delimit a space around the passenger. The privacy shell 14 is made for example from a composite material. Such a configuration allows to guarantee the privacy of the passenger in the seat 12.

A video screen 16 of a multimedia system or IFE (for "Inflight Entertainment System") can be installed on a rear part of the privacy shell 14 so as to be usable by a rear passenger.

The console 13 may comprise an upper wall 17 forming a table on which the passenger can place objects as well as a storage space 18 comprising one or more elements from a literature pocket, a bottle holder, or a minibar. The choice of storage equipments is configurable according to the wishes of the airline. The console 13 may also comprise a reading light 19 towards the seat 12.

A cavity 21 is located under the upper wall 17. The cavity 21 is laterally open towards the seat 12. In addition, a horizontal face 22 of the console 13 has in particular an armrest function. For this purpose, the horizontal face 22 may locally have a curved cuff shape 23 matching the shape of a portion of the passenger's arm.

The console 13 also includes a control unit 25 for the seat 12 and its additional components (called a "PCU" for "Passenger Control Unit"). The control unit 25 allows the passenger in particular to control the selection of a position of the seat 12 as well as the additional components, such as a video system, a heating device, a lighting ambiance system or any other additional component that can be integrated into the seat 12.

In order to allow the passenger to lie down, the console 13 may include a hollow space 27 in a phantom view in FIG. 1 in which an ottoman 28 is arranged. The ottoman 28 includes a horizontal face forming a footrest on which a rear passenger can place her/his feet when the seat 12 is in the "lying" position.

The seat unit 10 also includes a tray table 26 which can be used by a passenger for placing objects, in particular a meal tray, drinks, a computer, or any type of personal objects which the passenger would like to have available during her/his trip.

Figure 2:
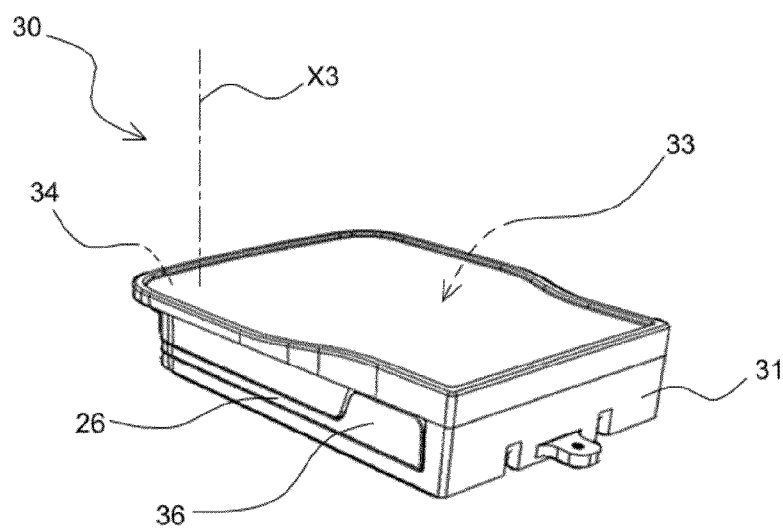
FIG. 2 is a perspective view of a tray table according to the invention in the stored position.

As can be seen in FIG. 2, the tray table 26 belongs to an item of furniture 30 comprising a frame 31 delimiting a housing 33. As shown in FIG. 3, a pivot connection 34 of axis X3 is arranged between the tray table 26 and the frame 31. The pivot connection 34 allows to rotate the tray table 26 relative to the frame 31 between a stored position in which the tray table 26 is inside the housing 33 in the frame 31 and a deployed position in which the tray table 26 is outside the housing 33 in the frame 31, as shown in FIG. 9.

The tray table 26 extends in a horizontal plane. The tray table 26 includes a handle 36 projecting from the body of the tray table 26. As it is explained below, this handle 36 can be grasped by the passenger after the ejection of the tray table 26 in order to move the tray table 26 to the deployed position.

Furthermore, as it is illustrated in particular in FIGS. 3, 5, and 6, a fixed arm 37 relative to the frame 31 carries a locking finger 38. The locking finger 38 is constituted by a stud projecting from one end of the arm 37. The locking finger 38 extends in a horizontal longitudinal direction of elongation. The arm 37 comprises at least one portion constituted by an elastic member 40. The elastic member 40 may for example be constituted by one or more flexible metal blades above one another.

A cam 43, clearly visible in FIG. 4, is provided with a locking recess 44 for receiving the locking finger 38 when the tray table 26 is in the stored position. As a matter of fact, as it is explained in more detail below, the elastic member 40, when it is under tension, biases the locking finger 38 into the locking recess 44 when the locking tray table 26 is in the stored position. The locking recess 44 has a shape complementary to that of the locking finger 38. In a side view, the locking recess 44 has, for example, an arc-shaped form. Any other shape of the locking recess 44 adapted to the shape of the locking finger 38 is conceivable.

The cam 43 has a rounded tip 47 at one end. The locking recess 44 is located on the opposite side relative to the rounded tip 47.

The cam 43 further comprises an upper lateral slope 48 and a lower lateral slope 49. Each lateral slope 48, 49 extends between the rounded tip 47 and the locking recess 44. The two lateral slopes 48, 49 form a non-zero angle with respect to each other.

The upper lateral slope 48 aims to guide the locking finger 38 towards the locking recess 44 while tensioning the elastic member 40 when the tray table 26 passes from the deployed position to the stored position.

The cam 43 may be associated with a guiding stop 45. The guiding stop 45 aims to ensure that the locking finger 38 engages into the locking recess 44 during a vertical movement of the locking finger 38. The guiding stop 45 laterally guides the locking finger 38 towards the locking recess 44 during this vertical movement. The guiding stop 45 may have a beveled face facilitating the guiding of the locking finger 38 towards the locking recess 44.

Furthermore, as it can be seen in FIGS. 5, 10a and 10b, a spring blade 50 aims to cooperate with a limit stop 51 when the tray table 26 is in the deployed position. The spring blade 50 is fixed relative to the frame 31. The spring blade 50 preferably has a U shape. The limit stop 51 is mechanically connected to the tray table 26.

More specifically, the limit stop 51 comprises a projecting portion 53 constituting a hard point and a receiving portion 54 of the spring blade 50. The receiving portion 54 has a shape complementary to that of the spring blade 50. The hard point 53 corresponds to a zone which is close to the deployed position of the tray table 26 and in which the deployment of the tray table 26 will require more effort from the passenger than in the remainder of the deployment travel from the stored position to the deployed position. For this purpose, the projecting portion 53 of the limit stop 51 is configured to cause a deformation of the spring blade 50 before the latter slides into the receiving portion 54. The limit stop 51 has an S shape, a curved portion of the S forming the hard point 53 and a hollow portion of the S forming the receiving portion 54 of the spring blade 50.

Advantageously, the tray table 26 integrates the cam 43 and the limit stop 51, so that the tray table 26, the cam 43, and the limit stop 51 form a single piece. The cam 43 and the limit stop 51 may be molded with the tray table 26. The tray table 26 may be made for example from a plastic material or a composite material.

As it can be seen in FIG. 5, an angle A1 between the limit stop 51 and the locking recess 44 of the cam 43 corresponds to the deployment angle of the tray table 26. The angle A1 is measured in the second direction of rotation R2. The angle A1 is measured in a top view in a counterclockwise direction from the locking recess 44. In this case, the angle A1 is of the order of 270 degrees. By "of the order of" it is meant a possible variation of plus or minus 10% relative to the indicated value. Alternatively, this angle A1 is of the order of 90 degrees, 180 degrees, or any other angle suitable for the application to allow deployment of the tray table 26. Preferably, the limit stop 51 and the locking finger 38 are located along the same circumference relative to the axis X3 of the pivot connection 34.

A return spring 56 visible in FIGS. 3, 7, and 9, is fixed to the frame 31. The return spring 56 can be compressed when pressing on the tray table 26 and then decompressed to eject the tray table 26 from the frame 31. The return spring 56 has the shape of a curved blade.

The operation of the "push-pull" system for moving the tray table 26 from the stored position to the deployed position is described below.

When the tray table 26 is in the stored position inside the housing 33 in the frame 31, the elastic member 40 under tension biases the locking finger 38 into the locking recess 44 (cf. FIG. 4). The spring blade 50 is in the free state, that is to say it is disengaged from the limit stop 51, as shown in FIG. 3.

In order to move the tray table 26 into the deployed position, the user presses on the tray table 26, which causes the tray table 26 to rotate inside the frame 31 in a first direction of rotation R1 about the axis X3. In order to allow this rotation, the frame 31 may include a clearance 57 (see FIG. 3) in which the handle 36 moves when a force is applied thereon along the arrow F1 towards the internal housing 33 in the frame 31.

The locking finger 38 is then released from the locking recess 44 by means of the elastic member 40 which exerts along the arrow F2 a downward force from the locking recess 44, as shown in FIG. 6. The return spring 56 is also compressed and applies a force towards the outside of the housing 33 in the frame 31.

When the user releases the force applied to the tray table 26, said tray table is ejected towards the outside of the housing 33 due to the decompression of the return spring 56, as shown in FIG. 7. During its ejection, the tray table 26 rotates about the axis of the pivot connection 34 in a second direction of rotation R2 opposite to the first direction of rotation R1. The locking finger 38 moves along the lower lateral slope 49 of the cam 43 along the trajectory of the arrow F3 shown in FIG. 8.

By pulling on the handle 36, the user can then continue the rotation of the tray table 26 to the deployed position in the second direction of rotation R2. The user can thus manually pivot the tray table 26 to the hard point 53. The spring blade 50 deforms at the hard point 53, as shown in FIG. 10a, then slides on the limit stop 51 until it cooperates with the receiving portion 54 of the limit stop 51, as shown in FIG. 10b. The tray table 26 is then in the deployed position as shown in FIG. 9.

In order to return the tray table 26 to the stored position, the user pulls on the handle 36 so as to deform the spring blade 50 so as to make it come out of the receiving portion 54 and pass the hard point 53. The user can then manually pivot the tray table 26 into the housing 33 in the first direction of rotation R1.

As it is illustrated in FIG. 11, the locking finger 38 then comes into contact with the cam 43 at the rounded tip 47. The locking finger 38 then rises along the upper lateral slope 48 of the cam 43 (see arrow F4), which has the effect of bending and therefore putting the elastic member 40 under tension. Under the action of the elastic member 40 under tension, the locking finger 38 undergoes a vertical force downwards in the direction of the locking recess 44. When the locking finger 38 comes into contact with the guiding stop 45, the latter laterally guides the locking finger 38 so that said locking finger 38 is inserted into the locking recess 44, as shown in FIG. 12.

The tray table 26 is then in the stored position. The return spring 56 is slightly compressed.

The invention has been described for a tray table 26 of an airplane seat. However, the previously described device for deploying the tray table 26 comprising the assembly "locking finger 38-cam 43-elastic member 40" can be integrated without difficulty in any item of furniture comprising a rotating movable element, such as for example a furniture door or a rotating movable shelf.

Of course, the different characteristics, variants and/or embodiments of the present invention may be associated with each other in various combinations insofar as they are not incompatible with or exclusive of one another.

Furthermore, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. An item of furniture for an airplane seat comprising:
   a frame;
   a movable element; and
   a pivot connection between the movable element and the frame for rotating the movable element relative to the frame between a stored position and a deployed position, wherein the item of furniture further comprises:
- a fixed arm relative to the frame, said arm carrying a locking finger;
- a cam integrated to the movable element, said cam being provided with a locking recess; and
- said arm comprising at least one portion constituted by an elastic member biasing, when it is under tension, the locking finger into the locking recess when the movable element is in the stored position,
- such that pressing the movable element causes the movable element to rotate in a first direction of rotation and release the locking finger from the locking recess by means of the elastic member so as to allow a rotation of the movable element towards the deployed position in a second direction of rotation, the first direction of rotation and the second direction of rotation being opposite to each other.

2. The item of furniture according to claim 1, further comprising a return spring which can be compressed when pressing on the movable element and then decompressed so as to eject the movable element from the frame.

3. The item of furniture according to claim 1, further comprising a spring blade fixed relative to the frame and a limit stop integrated to the movable element, the spring blade cooperating with the limit stop when the movable element is in the deployed position.

4. The item of furniture according to claim 3, wherein the limit stop comprises a projecting portion constituting a hard point and a receiving portion of the spring blade.

5. The item of furniture according to claim 4, wherein the limit stop has an S shape.

6. The item of furniture according to claim 4, wherein the movable element integrates the cam and the limit stop, so that the movable element, the cam, and the limit stop form a single piece.

7. The item of furniture according to claim 3, wherein an angle between the limit stop and the locking recess of the cam is of the order of 270 degrees.

8. The item of furniture according to claim 1, wherein the cam comprises at least one lateral slope for guiding the locking finger towards the locking recess while compressing the elastic member when the movable element passes from the deployed position to the stored position.

9. The item of furniture according to claim 1, wherein the movable element is a tray table.

10. An aircraft seat unit comprising an item of furniture defined according to claim 1.

* * * * *